(12) United States Patent
Snyder et al.

(10) Patent No.: US 10,307,970 B2
(45) Date of Patent: Jun. 4, 2019

(54) IN-SITU RESOURCE PREPARATION AND UTILIZATION METHODS

(71) Applicant: Made In Space, Inc., Moffett Field, CA (US)

(72) Inventors: Michael Snyder, Mountain View, CA (US); Jason Dunn, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 495 days.

(21) Appl. No.: 14/628,040

(22) Filed: Feb. 20, 2015

(65) Prior Publication Data
US 2015/0231826 A1     Aug. 20, 2015

Related U.S. Application Data

(60) Provisional application No. 61/942,100, filed on Feb. 20, 2014.

(51) Int. Cl.
| | |
|---|---|
| *B33Y 40/00* | (2015.01) |
| *B29C 67/00* | (2017.01) |
| *B29C 64/00* | (2017.01) |
| *B29C 64/165* | (2017.01) |
| *B29L 9/00* | (2006.01) |
| *B33Y 10/00* | (2015.01) |
| *B33Y 30/00* | (2015.01) |

(52) U.S. Cl.
CPC .......... *B29C 67/0081* (2013.01); *B29C 64/00* (2017.08); *B29C 64/165* (2017.08); *B33Y 40/00* (2014.12); *B29L 2009/00* (2013.01); *B33Y 10/00* (2014.12); *B33Y 30/00* (2014.12)

(58) Field of Classification Search
CPC ............................ B29C 67/0081; B33Y 10/00
See application file for complete search history.

(56) References Cited

U.S. PATENT DOCUMENTS

| | | | |
|---|---|---|---|
| 2002/0079601 A1* | 6/2002 | Russell ................... | B29C 41/12 264/40.1 |
| 2007/0109311 A1* | 5/2007 | Suda ....................... | G06T 13/00 345/582 |
| 2013/0237633 A1* | 9/2013 | Tamir ...................... | C08J 3/005 523/129 |

(Continued)

OTHER PUBLICATIONS

Khoshnevis et al., "Contour Crafting Simulation Plan for Lunar Settlement Infrastructure Build-Up," 2012, NIAC Phase-I Final Project Report.*

(Continued)

*Primary Examiner* — Robert A Vetere
(74) *Attorney, Agent, or Firm* — Terry M. Sanks, Esq.; Beusse Wolter Sanks & Maire, PLLC

(57) ABSTRACT

Methods of collecting in-situ materials on a celestial body for return to Earth or another location and associated devices are described. These devices and methods facilitate collection of samples and creation of portions of the return spacecraft via an additive manufacturing device contained within the lander craft. The additive manufacturing device is configured to produce portions of the return spacecraft (e.g., sample return container, spacecraft structure, heat shield) and may also be configured to place samples within the spacecraft for return and analysis.

17 Claims, 8 Drawing Sheets

(56) References Cited

U.S. PATENT DOCUMENTS

2014/0291886 A1\* 10/2014 Mark .................... B29C 64/118
264/163

OTHER PUBLICATIONS

Khoshnevis et al., "Lunar Contour Crafting—A Novel Technique for ISRU-Based Habitat Development," 2005, 43rd AIAA Aerospace Sciences Meeting and Exhibit.\*
Kamrani et al., "Rapid Prototyping Theory and Practice", 2006, published by Springer Sciences, pp. 221-249. (Year: 2006).\*
Bodiford et al., "Are We There Yet?. . . Developing In Situ Fabrication and Repair (ISFR) Technologies to Explore and Live on the Moon and Mars," 2005, AIAA 1st Exploration Conference 2005-2624, pp. 1-7. (Year: 2005).\*
"Celestial Body", Universe Today, Dec. 27, 2009, retrieved from https://www.universetoday.com/48671/celestial-body/ on Jan. 4, 2019. (Year : 2009).\*

\* cited by examiner

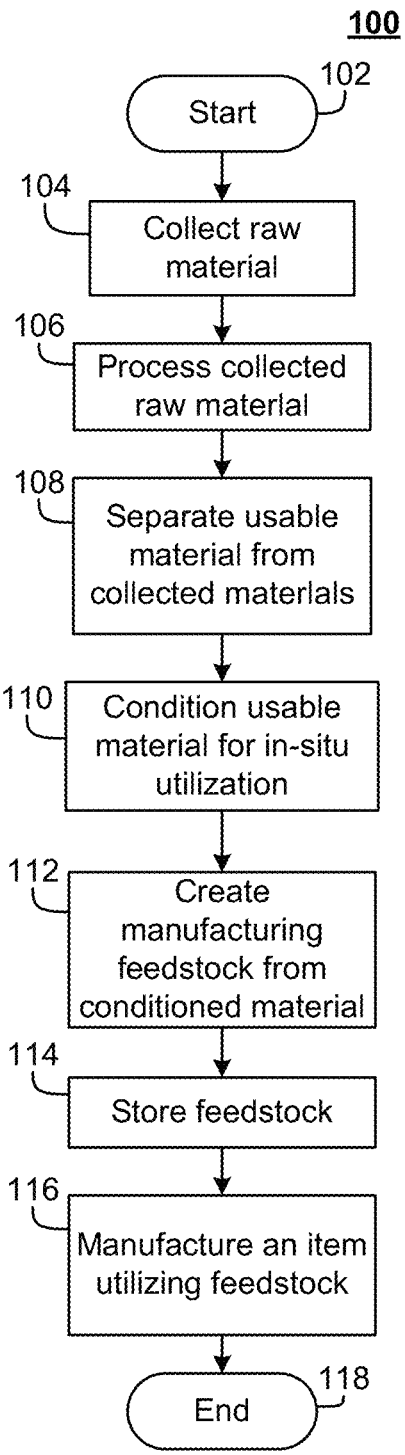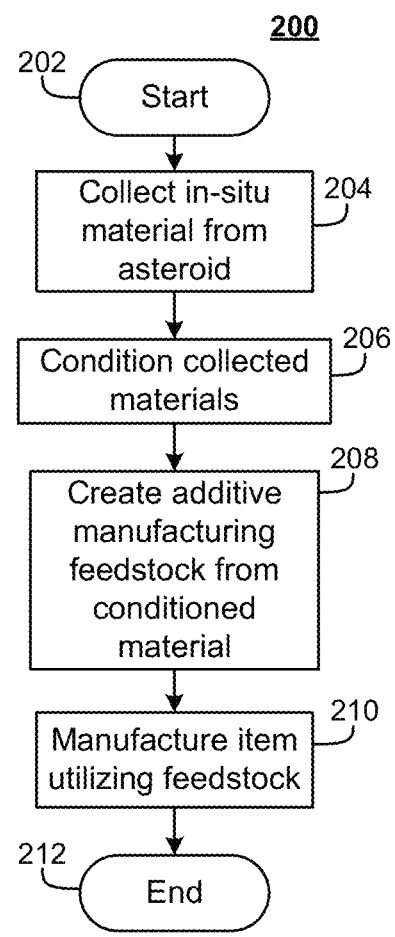
FIG. 1
FIG. 2

IN-SITU RESOURCE PREPARATION AND UTILIZATION METHODS

CROSS REFERENCE TO RELATED APPLICATIONS

This application claims the benefit of U.S. Provisional Patent Application No. 61/942,100, filed Feb. 20, 2014 and entitled "In-Situ Resource Preparation and Utilization Methods," the entire content of which are incorporated herein by reference. This application also incorporates by reference the entire contents of U.S. patent application Ser. No. 14/331,729, filed Jul. 15, 2014 and entitled "Manufacturing in Microgravity and Varying External Force Environments"; U.S. patent application Ser. No. 14/555,234, filed Nov. 26, 2014 and entitled "Metal Casting Methods In Microgravity And Other Environments"; and U.S. patent application Ser. No. 14/604,743, filed Jan. 25, 2015 and entitled "Recycling Materials In Varying And Reduced Gravity Environments."

FIELD OF THE DISCLOSURE

The present disclosure generally relates to off-planet manufacturing and more particularly to apparatus, systems and methods for utilizing in-situ materials as feedstock for additive manufacturing devices.

BACKGROUND

The statements in this section merely provide information related to the present disclosure and may not constitute prior art.

Sourcing building materials is essential for off-planet operations, yet transportation of building materials from Earth to an off planet location is prohibitively expensive, complicated, and time consuming.

Hauling each piece of equipment necessary for a mission from Earth to an off-planet location such as the Moon, Mars, an asteroid, or other celestial body is problematic because the launch vehicles utilized to deliver payloads to space (e.g., the Atlas V® vehicle (available from United Launch Alliance, LLC of Centennial, Colo.), the Falcon 9 v. 1.1 vehicle (available from Space Exploration Technologies, Inc. of Hawthorne, Calif.), and the like) have limited payload capacities, cost over $1,000 per kilogram to launch a payload, and have significant wait times and approval processes associated with launching a payload. Despite the difficulty of transporting materials off-planet, since the first missions into space and to other worlds, everything has been brought from Earth. The in-situ, on location materials have been studied but never utilized.

Utilization of in-situ resources found in space or on celestial bodies would enable exploration, study and exploitation of such environments in ways which parallel expeditions in the Age of Exploration. During the Age of Exploration, naval vessels explored the oceans in search of new trade routes and lands. During these expeditions, explorers "lived off the land," catching fish, trapping game, and harvesting timber. Without taking advantage of local resources, such expeditions would have had to have been significantly larger and likely would not have traveled as far because transporting enough food, spare parts, fuel for fires and other materials would have occupied significantly more cargo volume. Samples of newly discovered flora and fauna were also gathered for study and exploitation upon their return. These explorers also sought and found rare minerals such as gold, which they shipped back to Europe for significant profit.

Upon reaching a newly discovered land, explorers often constructed small settlements from locally-sourced materials in order to more efficiently gather local resources. These settlements were also used to resupply other expeditions. Some also served as construction facilities (e.g., a shipyard), constructing ships, wagons, and other vehicles for use in transporting goods back to Europe or to other locations and for further exploration. Utilization of locally-sourced materials enabled self-sustaining settlements and colonies and enabled longer, multi-stop exploration or trading expeditions.

Exemplary resupply missions to the ISS utilize unmanned spacecraft, such as the Dragon capsule (available from Space Exploration Technologies, Inc. of Hawthorne, Calif.), the Russian Progress freighter spacecraft, or the Cygnus vehicle (available from Orbital Sciences Corporation of Dulles, Va.). The resupply spacecraft is launched into orbit carrying supplies including new equipment, replacement parts, fuel, oxidizer, food, water and scientific experiments. The spacecraft docks with the ISS and is unloaded. The spacecraft is then reloaded. If the spacecraft is capable of being returned to Earth and being recovered (e.g., the Dragon capsule), it is loaded with science experiments, old station hardware, equipment and trash. The spacecraft is then launched, returning to Earth for recovery. If the spacecraft is not capable of being recovered, the spacecraft is typically loaded with trash and launched where it burns up on reentry.

Trash management is problematic in isolated locations such as aboard a spacecraft, on naval vessels, and at remote outposts. In the ISS, all trash is stored on board in the habitable volume until it is disposed of as described above. Astronauts compress the trash by hand into stowage bags, but this can only reduce the volume by an estimated 50%. The present "store and return" method has limitations. For example, it will not meet the requirements for future human space exploration missions. Missions to deep space destinations such as the Moon, asteroids, Lagrange Points, and Mars will require different disposal methods. Ejecting trash into space, as practiced with liquid waste during the Apollo missions, is not practical or efficient for solid trash such as packing materials, broken equipment, and the like. With the possibility of resupply years between or nonexistent, astronauts must bring everything with them, meaning every piece of cargo is a precious resource. Furthermore, missions will need to safely manage waste and avoid polluting and contaminating other solar system bodies by, for example, abiding by NASA's Planetary Protection Policy (NASA NPD 8020.7. "Biological Contamination Control for Outbound and Inbound Planetary Spacecraft").

Currently, recycling or repurposing materials in space presents several problems. Among traditional recycling processes do not function in the microgravity environment of space. Similarly, current recycling processes are not adapted for use in high acceleration and vibration environments such as those found aboard a naval vessel or submarine.

Given the foregoing, apparatus, systems and methods are needed which facilitate in-situ resource utilization in space and on other celestial bodies. Additionally, apparatus, systems and methods are needed which facilitate reducing mass and volume devoted to on-site habitats and equipment.

Additionally, what is needed are apparatus, systems and methods which facilitate sample and material return from off-planet sites such as the Moon, Mars, asteroids, and other celestial bodies.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

The harvesting and use of materials (e.g., lunar regolith, Martian soil, extraterrestrial minerals, ores, ice, dirt, or dust, or the like) from sources in space is very useful because it will reduce mass and enable new paradigms for space missions. In order for the resources to be used, they must be conditioned in such a way to enable manufacturing methods and devices to utilize them. The conditioned material can be used for multiple applications. Applications include common uses similar to terrestrial utilizations as well as more space-specific applications such as being used for heat shielding, sample return mechanisms and containers, radiation shielding, and structures. The devices and processes described enable the use of locally-sourced materials for not only the described manufactured components but for use in any desired manufacturing process. Another capability the present disclosure enables is for the combination of multiple elements into one device that allows material to be collected and processed into a usable form. This type of device, for many applications, does not exist in even an Earth environment.

Aspects of the present disclosure meet the above-identified needs by providing apparatus, systems, and methods which facilitate construction of parts, habitats, and other structures using in-situ materials. Aspects of the present disclosure are adapted to use locally sourced regolith, minerals, ore, or other solid materials to produce objects. Objects produced may be small objects, such as a hand tool, sample return container, or the like. Larger objects may also be produced, such as a shelter, a habitat, a launch or landing pad, a spacecraft, parts of a spacecrafts including, but not limited to, an ascent engine, a heatshield, roads, or portions thereof.

Such apparatus, systems, and methods enable more capable missions because less up-mass launched from earth, a celestial body starting point, a staging point, or the like must be devoted to structures and parts which can be created on site. The use of in-situ materials may facilitate more efficient, cheaper, and more advanced types of exploration and settlement missions in space. There are currently many examples of what the materials could hypothetically be used for but little effort has been placed into the gathering and processes of the materials. Aspects of the present disclosure enable such hypothetical uses. There currently is no infrastructure in space to enable the use of materials and the amount of materials that are brought from Earth are limited by launch and cost restrictions. The present disclosure enables the building blocks for in space infrastructure and enables new types of missions to be created.

Aspects of the present disclosure provide a process for returning samples or other materials (e.g., rare earth minerals, desirable elements or compounds, objects constructed off-planet) to Earth or to another location.

In an aspect, the creation of containers, structures, and shielding using in-situ material is disclosed. Such structures do not need to be launched from Earth, rather they may be constructed on-site. One example is the creation of sample containers using local resources to house samples that are returned to Earth. Such a container may be created on the Moon or Mars, then filled with Lunar or Martian material and placed on a return vehicle is a direct example. In other aspects, locally-sourced materials may be used to construct entire return vehicles and also filling them with local resources.

In an aspect, a process for creating feedstock suitable for utilization by an additive manufacturing device is disclosure wherein the feedstock is created from in-situ materials. Raw, in-situ material is gathered. Such material may be, for example, lunar regolith. The collected material is then processed in order to identify and/or create material suitable for use by the additive manufacturing device. All manufacturing processes require the base material (i.e., the feedstock) be prepared to certain shapes and sizes to be handled by machinery or humans in order to create the necessary end product. Most traditional manufacturing requires the workable material be larger than the final product that is to be machined. On the other hand, many additive manufacturing process require the feedstock to be small relative to the end product being produced, thereby requiring processing and sorting of the collected material. The processed material may be placed in a conditioning device, which will physically and/or chemically process the locally-sourced material into a usable form. Feedstock (e.g., a concrete-like composite, a powder of metal alloy, or a spool of polymer) may be created from the conditioned material. The feedstock may be used to produce desired end products.

The present disclosure may be utilized to create, augment and/or repair heat shields (e.g., ablative heat shields) in order to facilitate the return of a spacecraft that has landed on a celestial body. Heat shields are one of the major mass considerations of the subsystems that are necessary to protect a spacecraft from disintegrating during entry into planetary atmospheres. While many focus on reducing the mass of the heat shield through the use of more durable materials or integration of complex subsystems, almost all designs require the device to be built and flown from Earth. Thus, a high mass penalty at launch will almost always be incurred by propelling the heat shield of the containment return vehicle with the spacecraft into space. Such heat shields, or a significant portion thereof, are often not utilized until the spacecraft returns to Earth, therefore spacecraft may be launched to an in-situ resources location (e.g., the Moon), carry out a mission, construct a heat shield from in-situ resources using apparatus, systems, and methods and return to Earth or another location, protected by the heat shield made from in-situ materials. In this manner, the present disclosure facilitates launching more useful up-mass because less up-mass must be devoted to the return heat shield. Furthermore, additive manufacturing devices utilized to produce the heat shield from in-situ materials may be utilized to create other useful objects. Depending on operational considerations, the additive manufacturing device may or may not be returned on the return portion of the flight.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIG. 1 is a flowchart depicting an exemplary process for preparing in-situ materials for use as manufacturing feedstock, according to an aspect of the present disclosure.

FIG. 2 is a flowchart depicting an exemplary process for construction utilizing in-situ materials, according to an aspect of the present disclosure.

DETAILED DESCRIPTION

Figure 3:
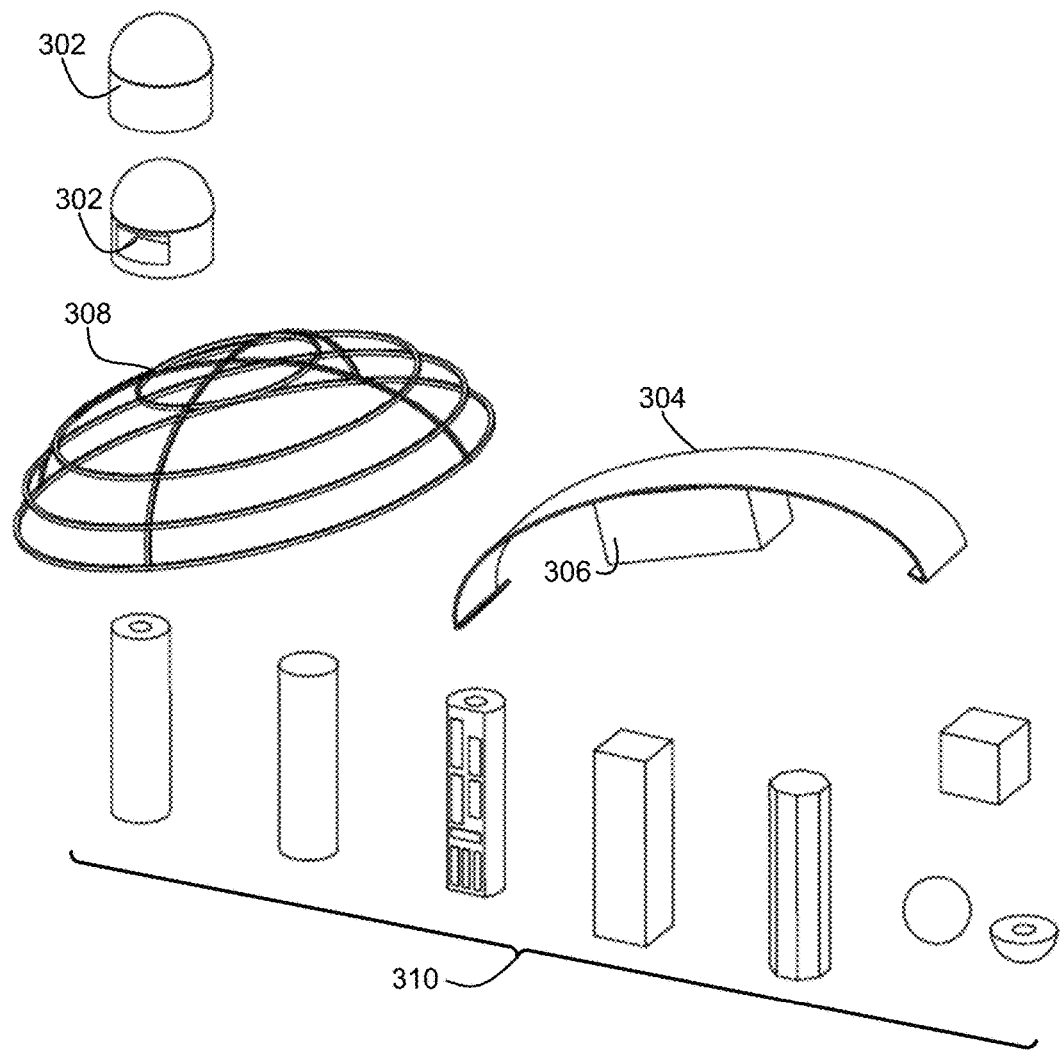
FIG. 3 is an image of various configurations of parts created from in-situ materials, according to various aspects of the present disclosure.

The present disclosure is directed to apparatus, systems and methods which facilitate construction of parts, habitats, and other structures using in-situ materials. Aspects of the present disclosure are adapted to use locally sourced regolith, minerals, ore, or other solid materials to produce objects. Objects produced may be small objects, such as a hand tool, sample return container, or the like. Larger objects may also be produced, such as a shelter, a habitat, a launch or landing pad, roads, or portions thereof.

Aspects of the present disclosure provide a process for returning samples or other materials (e.g., rare earth minerals, desirable elements or compounds, objects constructed off-planet) to Earth or to another location. In an aspect, a sample return vehicle comprising a sample return container is created. The sample return container is manufactured from conditioned in-situ materials by an additive manufacturing device. The sample being returned is placed within the container by the additive manufacturing device or by another device or an astronaut. Portions of the sample return vehicle (e.g., the body, the motor nozzle) may be manufactured from conditioned in-situ materials by the additive manufacturing device, thereby printing all or multiple portions of a sample return vehicle. The sample return vehicle may then be launched on a trajectory which returns the sample to Earth or another desired destination.

Apparatus, systems and methods described herein may utilize apparatus, systems, and methods described in co-pending applications, namely, U.S. patent application Ser. No. 14/331,729, filed Jul. 15, 2014 and entitled "Manufacturing in Microgravity and Varying External Force Environments"; U.S. patent application Ser. No. 14/555,234, filed Nov. 26, 2014 and entitled "Metal Casting Methods In Microgravity And Other Environments"; and U.S. patent application Ser. No. 14/604,743, filed Jan. 25, 2015 and entitled "Recycling Materials In Varying And Reduced Gravity Environments," all of which are incorporated by reference herein.

An exemplary utilization of apparatus systems and methods described herein is a sample return mission from the Moon, Mars or another celestial body. A spacecraft is launched from, for example Earth, on the sample return mission. The spacecraft includes apparatus for collecting in-situ materials and one or more additive manufacturing devices which may be utilized to create sample return canisters, a heat shield, place in-situ materials in the canisters, and the like. These systems facilitate building ballistic reentry vehicles using In-Situ Resource Utilization (ISRU) located on the target celestial body in order to facilitate sample return missions. These resources may be fashioned into a heat shield and sample return canister using an organic binder produced from bacteria taken with the mission in order to form a composite 'concrete' with gathered regolith. The bacteria may replicate with sunlight and water derived from ice inside a bioreactor, forming the protein needed to create an organic binder for use with the captured regolith and thus creating a biocomposite material. Samples may then be placed inside the constructed containers and sealed with the same manufacturing process. Because the large heat shield and supporting structure on the reentry vehicle are created at the destination, more mass can be added to the initial spacecraft launched and much more mass can potentially be lifted from the surface of the target celestial body and returned.

In some aspects, such a regolith-binder extrusion printing process is less energy-demanding compared to sintering which requires a focused laser, electron beam, or microwave beam to fuse regolith particles together. Sintering of regolith by thermal means may require more than 0.5 MJ of energy for 2 kg of finished product. Melting of regolith may require even more energy. By contrast, the regolith biocomposite material disclosed above, which relies on biological production of the binding agent, may require only approximately 5 J of energy to produce 2 kg of finished product.

In lieu of an organic binder produced on site, the spacecraft may include an organic or inorganic binder supply. The binder may be combined with in-situ material in order to additively manufacture parts.

Referring now to FIG. 1, a flowchart depicting an exemplary process 100 for preparing in-situ materials for use as manufacturing feedstock, according to an aspect of the present disclosure, is shown.

All manufacturing processes require the base material (i.e., the feedstock) be prepared to certain shapes, sizes, and composition in order to be handled by machinery or humans and create the necessary end product. Most traditional manufacturing requires the workable material be larger than the final product that is to be machined. On the other hand, many additive manufacturing process require the feedstock to be small relative to the end product being produced, thereby requiring processing and sorting of the collected material. Some additive manufacturing devices require the feedstock be divisible on the micron scale and constrained to particular bulk diameters, depending on the device utilized. Processes requiring powder have limitations to the shape and size that can be put in the system for use. Homogeneity may also be a requirement for powder-based additive manufacturing devices as any nonconforming or contaminating material reduces the quality of the final product. Processes requiring wire feed material have limitations to the diameter of the usable feedstock. Some additive manufacturing processes does not require homogeneous material in order to produce functional parts. The processing effort required to be applied to collected in-situ materials depends on the manufacturing process that the collected material will ultimately be subjected to.

Process 100, at least a portion of which may be executed on a celestial body such as the Moon, Mars, an asteroid, or the like, facilitates production via additive manufacturing of parts, structures, or portions thereof from conditioned in-situ materials. Process 100 begins at step 102 with control immediately passing to step 104.

At step 104, in-situ materials are collected. The collection of materials can be performed by gathering surface material such as regolith, mining resources from subsurface veins, collection of resources that are free standing (e.g., manmade space debris, manmade debris, asteroids, or the like), or other processes apparent to those skilled in the relevant art(s) after reading the description herein.

At step 106, the collected material undergoes the first of one or more steps to prepare the material for utilization in manufacturing. The collected material is placed in a processing device, such as a recycling device, grinder, or other device, where the material is processed. In various aspects, depending on the desired materials for manufacturing, the local environment, and the composition and structure of the collected materials, the collected material is physically and/or chemically processed into a usable form. In an aspect, such chemical and physical processes are similar to Earth-based processes. In another aspect, recycling devices, grinders, casting processes, and other devices adapted for use in varying and/or non-one G environments are utilized. Similarly, such devices may be used at other steps of processed disclosed herein Recycler devices in accordance with the present disclosure may repurpose parts which were improperly additively manufactured into the feedstock utilized, thereby facilitating subsequent attempts to create the desired part without wasting feedstock. Used parts, obsolete parts, single use items, trash and the like may be repurposed into feedstock and subsequently used to print a part that is more immediately useful. In emergency situations or situations with limited supplies, objects may be "cannibalized" into additive manufacturing device feedstock by recycler devices in accordance with the present disclosure and repurposed into needed items by an additive manufacturing device on site, thereby potentially alleviating problems in resource scarce situations or in situations where the right tool is not immediately available because objects without a use can be converted to useful objects.

Please add the following seven paragraphs after the last paragraph of the specification:

A size reducer reduces the size of materials inserted into a recycler device from their original size to a shape and size suitable for use in an extrusion mechanism. The size reducer may shred, grind, cut and/or pulverize material into portions small enough for utilization by the extrusion mechanism. In an aspect, the extruder requires materials no larger than three millimeters in diameter. In such an aspect, the size reducer is configured to break material apart into portions no larger than three millimeters in diameter.

In some aspects, a material size reducer and/or other portions of a material processing system includes heating elements configured to heat material within a size reducer in order to make the material more malleable, melt some or all of the material, or otherwise facilitate reduction of the size of pieces of the material. Cooling elements may also be included in order to provide additional control over material temperature.

A recycler device may also include one or more material sorting elements. Material sorting elements are configured to sort material inserted into the recycler device into various types (e.g., food waste, metal, aluminum, ferrous metal, non-ferrous metal, plastic and the like). Sorted material may then be processed by other portions of the recycler device in order to create filament having a uniform material make up. The recycler device may also include one or more storage containers for each type of material. Sorted material in the storage containers may be selectively sent into other portions of the recycler device in order to be turned into filament containing such material (as a pure filament or mixed with other types of materials). Such containers may include material control sub systems configured to operate like the material control system and force material from the container. In other aspects, sorting is done by the recycler device users who only place the desired material types in device.

Material processing system may include various filters, dehumidifying elements, drying elements, sieves, grates and the like in order to render processed material suitable for conversion to filament by other portions of the recycler device.

The extrusion mechanism receives material from the size reducer, further manipulates the size and shape of the material, heats the material via one or more attached heating elements and pushes the pliable or molten material through a die in order to create filament or other feedstock. Material may be moved through extrusion mechanism via an auger, a piston, another mechanism apparent to those skilled in the relevant art(s) or a combination thereof. The extrusion mechanism may include one or more flowmeters, heating elements, cooling elements, filters, screens, grates, breaker plates, expansion volumes, gear pumps and the like. Such components may be selected and positioned to reduce impurities in the material, homogenize the mixture of the material, eliminate air bubbles, control flow rate, maintain pressure within the material and/or reduce temperature variations. Such components may be selected and positioned to facilitate other design constraints apparent to those skilled in the relevant art(s) after reading the description herein.

Spooling assembly is configured to receive filament as it exits extrusion mechanism at a die and spool filament onto a spool suitable for utilization by additive manufacturing device, such as a removable filament cartridge. Spooling assembly may comprise a spooling mechanism, such as a rotating wheel configured to receive and spool filament. One or more portions of spooling assembly may be controlled by spooling control. Spooling control may be controlled by an attending technician or controlled by control system. In an aspect, filament is spooled within a removable cartridge configured to connect to an additive manufacturing device and provide filament for its utilization. In one such aspect, within cartridge enclosure, filament is fed through the center of the spool and exits cartridge from a side panel of cartridge.

In an aspect, the additive manufacturing device is configured to produce parts using filament. Additive manufacturing device may be configured to utilize a polymer filament, metal filament, filament made from a mixture of materials, and the like.

At step 108, usable material is separated from contaminants. Such contaminants may be a by-product of portions of process 100, contaminants from the local environment, or portions of the collected material which cannot be used for manufacturing. Separation may happen through physical, chemical, or electromagnetic means (e.g., using robotic sorters, centrifuges, magnets, or the like).

At step 110, the material may be conditioned in order to be utilized in manufacturing. Some material deemed for manufacturing process such as direct regolith binding, sintering, and casting requires little processing and separation but requires particle size to be in a particular range. Conditioning material for this process can take place by mechanical means such as sifting through appropriate sized grates. Other manufacturing methods requiring specific sized and shaped material can be satisfied by grinding, cutting, pulverizing, and chemically reducing until the appropriate parameters are met. Satisfying traditional manufacturing methods will require forming into blocks, plates, rods or other 3D objects that are capable of being machined. This can take place by casting, forging, extrusion, cold heading, stamping, screw machining, or forming powders into desired geometries.

At step 112, the conditioned material is converted into an appropriate feedstock. In some aspects, this step is omitted. In another aspect, a wire-based feedstock is required and the conditioned material is extruded.

At step 114, the feedstock is stored for later utilization.

At step 116, a desired part, structure, or portion of a structure is produced. Once the materials are in feedstock form, manufacturing can take place in-situ. Multiple items can be created using various manufacturing techniques. Components could include sample containers, storage facilities large and small, transportation devices, mining facilities, shelters, solar power facilities, heat shields, radiation shields, debris shields, walkways, launch pads, and other structural elements such as trusses.

Process 100 then terminates at step 118.

Referring now to FIG. 2, a flowchart depicting an exemplary process 200 for construction utilizing in-situ materials, according to an aspect of the present disclosure, is shown.

Process 200, at least a portion of which may be executed on an asteroid, depicts an aspect of process 100 and facilitates production via additive manufacturing of parts, structures, or portions thereof from conditioned in-situ materials. Process 200 begins at step 202 with control immediately passing to step 204.

At step 204, in-situ materials are collected from the asteroid. In an aspect, minerals may be robotically mined from the asteroid and placed within a grinding apparatus or a recycling device for ultimate use by an additive manufacturing device positioned on the surface of the asteroid. In another aspect, the collected material is placed in a storage container for later conditioning, transportation to the conditioning device, or the like.

At step 206, the collected material is conditioned for utilization in manufacturing. In various aspects, the conditioning carried out is the conditioning described in relation to steps 106, 108 and/or 110.

At step 208, the conditioned material is converted to a feedstock for an additive manufacturing device.

At step 210, desired items are produced on site utilizing the feedstock created from the in-situ materials and process 200 then terminates at step 212.

Referring now to FIG. 3, an image of various configurations of parts created from in-situ materials, according to various aspects of the present disclosure, is shown.

In-situ materials may be utilized to produce a variety of objects. In various aspects, objects are created comprising in-situ materials mixed with binders, resins, or other agents provided from Earth or another location.

Objects which may be produced include sample return containers 302, ablative or non-ablative heat shielding 304, a part structure or frame 308, and the like. More generally, objects 310 having the desired structure, size and other features may be created such as blocks, spheres having an internal volume, columns having internal and/or external features and the like. A sample 306 of the celestial body where sample return container 302 is produced may be placed inside sample return container 302 via an additive manufacturing device (see FIG. 6) or another means. Sample return container 302 may have an internal volume 312 where sample 306 may be placed for return.

Figure 4:
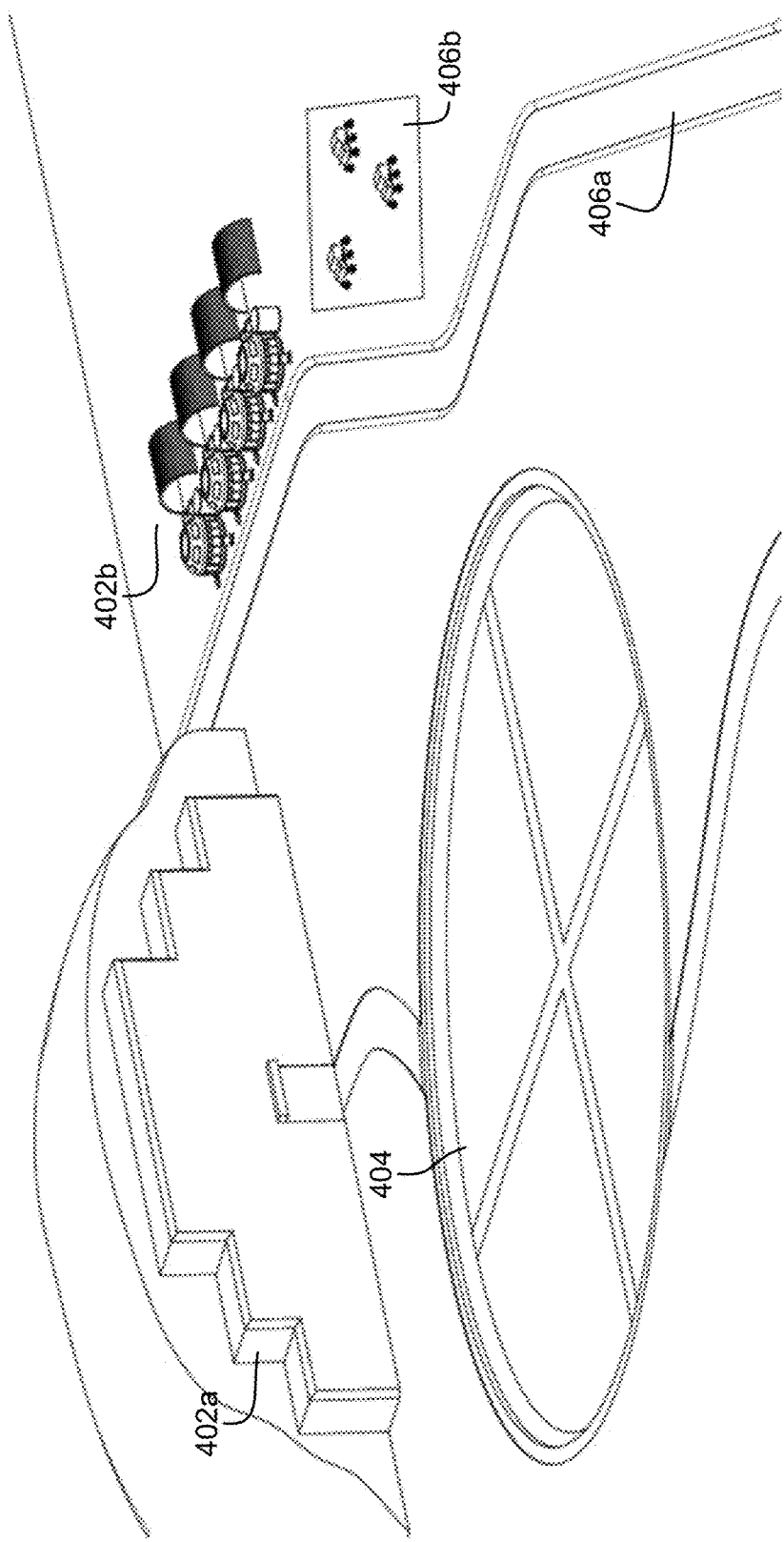
FIG. 4 is an image of various structures created from in-situ materials, according to various aspects of the present disclosure.
Figure 10:
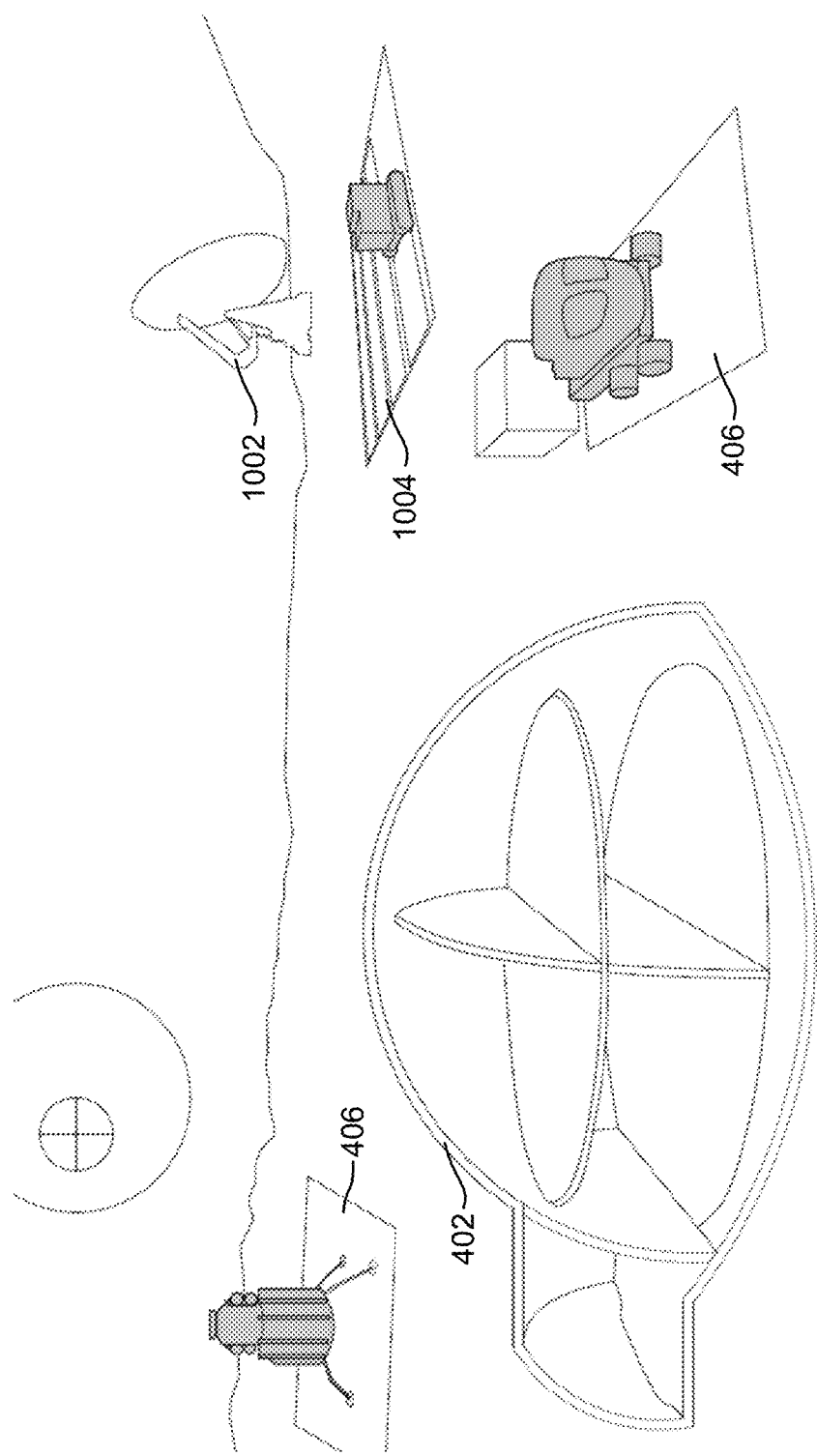
FIG. 10 is an image of various structures created from in-situ materials, including a cutaway view of a habitat, according to various aspects of the present disclosure.

Referring now to FIGS. 4 & 10, an image of various structures created on a celestial body from in-situ materials, according to various aspects of the present disclosure, is shown.

In various aspects, apparatus, systems, and methods of the present disclosure may be utilized to produce infrastructure such as habitats 402 (labeled as habitats 402a, b in FIG. 4), launch or landing pads 404, surfaces 406 (labeled as surfaces 406a, b in FIG. 4), antenna support structure 1002, foundations 1004, pressure vessels, pipelines, burms, walls, bricks, scaffolding, or portions thereof. Surfaces 406 include roads, walkways, storage areas and the like. FIG. 10 depicts habitat on a celestial body such as the moon.

Figure 5:
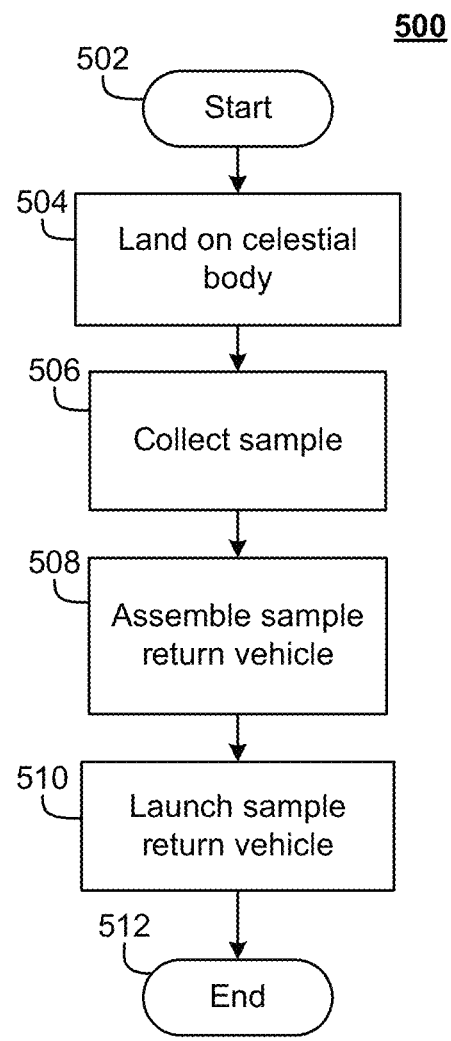
FIG. 5 is a flowchart depicting an exemplary process for recovering a sample from a celestial body, according to an aspect of the present disclosure.

Referring now to FIG. 5, a flowchart depicting an exemplary process 500 for recovering a sample from a celestial body, according to an aspect of the present disclosure, is shown.

Process 500 facilitates a sample return mission wherein the sample return vehicle is not transported from the surface of the Earth (i.e., launched). Rather, the sample return vehicle is manufactured in-situ, enabling a larger sample return vehicle, a smaller launch spacecraft launched from Earth, and the like. In various aspects, additive manufacturing of sample return container 302 and/or sample return vehicles are facilitated in order to bring samples from celestial bodies to other locations in the solar system, including Earth return. This reduces launch mass from Earth as well as complexity for harvesting lunar samples and stowage for Earth return. By creating the sample return vehicle or a portion thereof via additive manufacturing and using the sample material as feedstock (i.e. regolith as feedstock), a sample return mission can be far more feasible.

Process 500, at least a portion of which may be executed on a celestial body such as the Moon, Mars, an asteroid, or the like, facilitates a sample return mission. Process 500 begins at step 502 with control immediately passing to step 504.

At step 504, a spacecraft comprising an additive manufacturing device, an in-situ material collection device, and material collection and conditioning devices lands on a target celestial body. The spacecraft is adapted to land on the celestial body, collect a sample of the celestial body, construct a sample return vehicle and launch the sample return vehicle (e.g., back to Earth).

At step 506, sample 304 is collected. In an aspect, sample 304 is collected utilizing the same methods for collecting materials to construct parts or structures via additive manufacturing (e.g., collection step 104, collection step 204). Sample 304 may be collected via other processes apparent to those skilled in the relevant art(s) after reading the description herein.

At step 508, a sample return vehicle is constructed utilizing in-situ materials. In an aspect, sample return container 302 is constructed and portions of a sample return vehicle are constructed utilizing process 100. Process 100 may utilize equipment contained in the sample return spacecraft.

At step 510, the assembled sample return vehicle is launched and process 500 then terminates at step 512.

Figure 6:
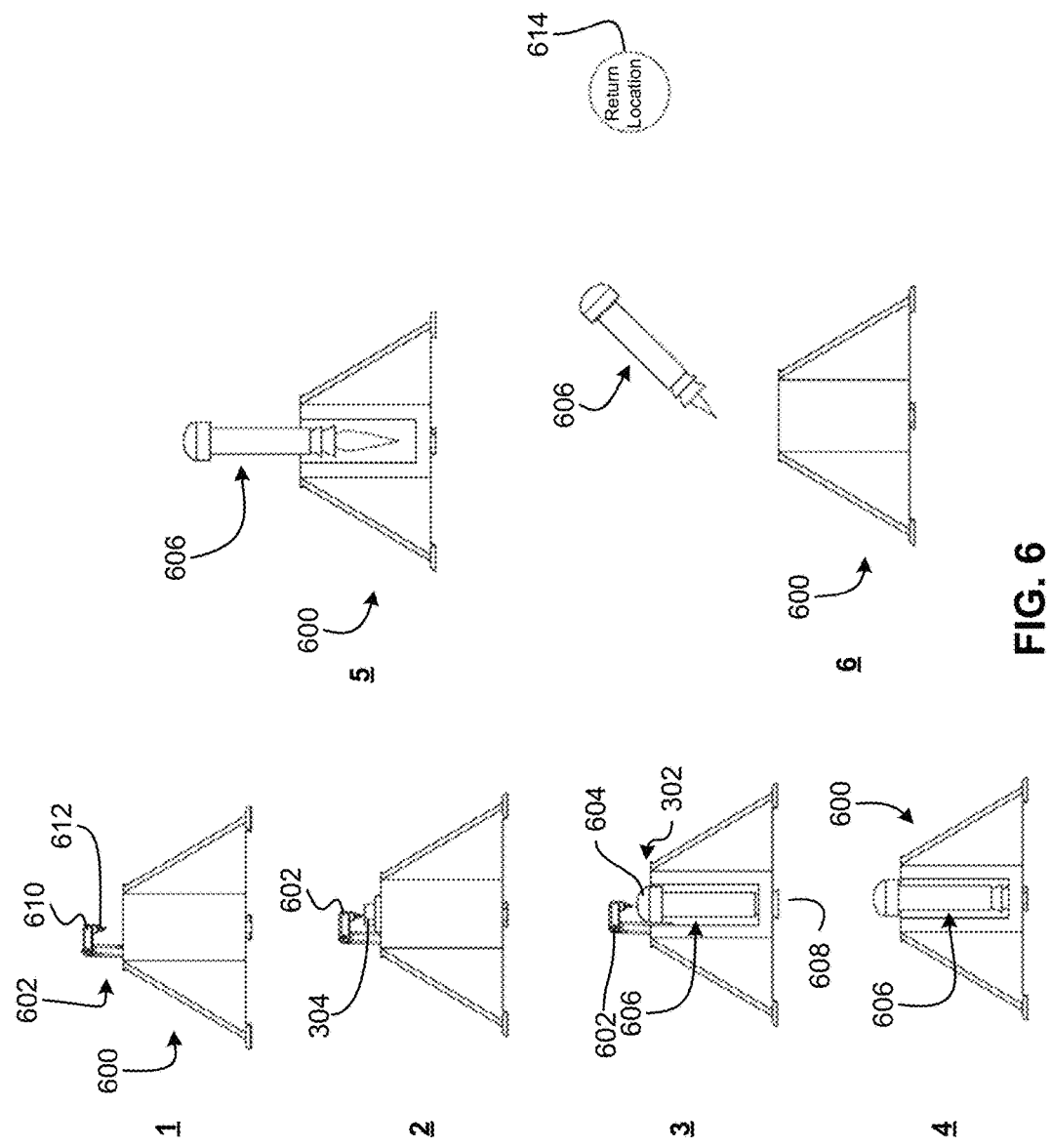
FIG. 6 is a series of images depicting various stages of an exemplary process for recovering a sample from a celestial body, according to an aspect of the present disclosure.

Referring now to FIG. 6, a series of images depicting various stages of an exemplary process for recovering sample 304 from a celestial body, according to an aspect of the present disclosure, is shown.

Landing craft 600 is configured to gather sample 304 from a celestial body, place sample 304 in a particular location (e.g., on/in/as a portion of a sample return vehicle), and additively manufacture sample return container 302 around sample 304 in order for it to survive the journey back to Earth or another destination. A sample return vehicle 606 or sample return container may additionally comprise heat shield 306. This type of effort would be greatly beneficial to specifically the lunar environment where the regolith is widely available on the surface and capable of being used for manufacturing and the material holds the properties that would allow it to reenter the Earth's atmosphere if the production piece is designed properly. Through an ablative process, the additively manufacturing heat shield built using the in-situ resources will protect the sample inside from being destroyed during re-entry.

Landing craft 600 comprises an additive manufacturing device 602 comprising an extruder 612 positionable by an arm 610 (FIG. 6:1). Arm 610 may contain feed channels for feedstock utilized by extruder 612. As will be apparent to those skilled in the relevant art(s) after reading the description herein, feedstock may be supplied to extruder 612 via other pathways or mechanisms. Additive manufacturing device 602 may construct sample return container 302 (FIG. 6:3-4) and be used to place sample 304 (FIG. 6:2) within sample return container 302. In an aspect, sample 304 is placed by the extruder of additive manufacturing device 602 within a partially completed sample container 302 and container top 604 is subsequently manufactured and placed over sample 304. Container top 604 may also be heat shield 304. Upon completion of sample return vehicle 606, vehicle 606 may be launched on a return trajectory to a return location 614 such as Earth or another destination in the solar system (FIG. 6:5). Exhaust nozzle 608 may be additively manufactured from regolith or other in-situ materials, supplied with vehicle 606 or created by additive manufacturing device 602 using an on board supply of material. In an aspect, at least a portion of landing craft 600 remains behind on the celestial body (FIG. 6:6). In another aspect, the entire craft 600 is launched in order to return to Earth or another destination.

In an aspect, landing craft 600 may be launched in its entirety after collecting sample 304, leaving no portion of landing craft 600 behind.

In an aspect, additive manufacturing device 602 constructs sample return container 302 and attaches to the top of sample return vehicle 606. In this way, the sample return container is built one layer at a time using in-situ resources, such as a concrete-like composite. Sample return container 302 is built with an open volume which is filled with the sample 304. After sample 304 is added, additive manufacturing device 602 continues to build the sample return container 302 in such a way as to encapsulate sample 304 inside, creating a ballistic re-entry heat shield that is capable of allowing sample 304 to survive re-entry. Also, since the entire sample return container 302, with sample 304 inside, is attached to sample return vehicle 606, it will have a physical connection to re-entry avionics, power, communications, and entry, descent, landing capabilities. The additive manufactured aspect provides the needed heat shield for re-entry along with a method of returning the desired sample 304.

Figure 7:
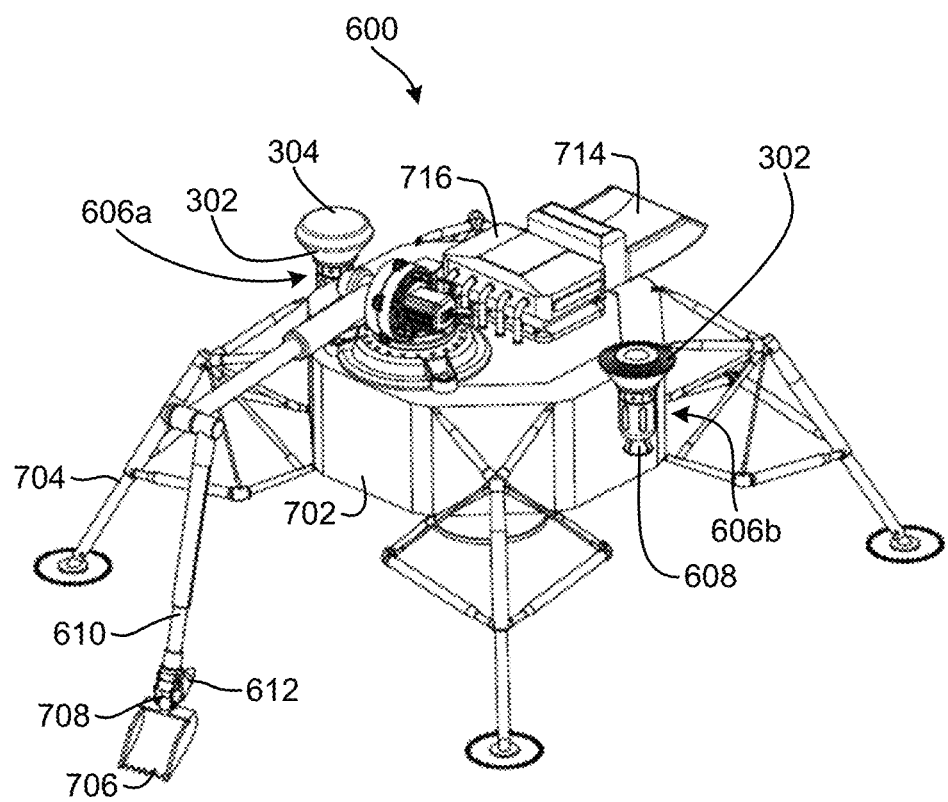
FIG. 7 is a perspective view of a landing craft configured to collect and process in-situ materials from a celestial body for use in additively manufacturing portions of sample return spacecraft, according to an aspect of the present disclosure.
Figure 8:
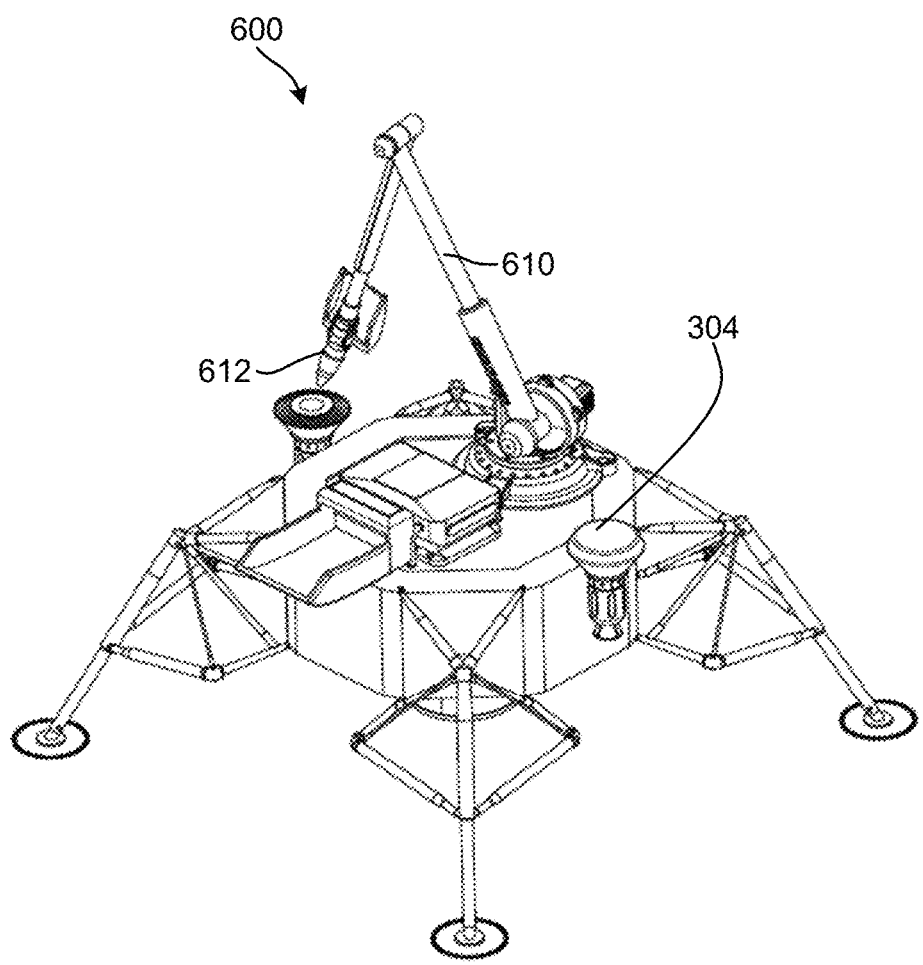
FIG. 8 is an opposite perspective view of the landing craft of FIG. 7.
Figure 9:
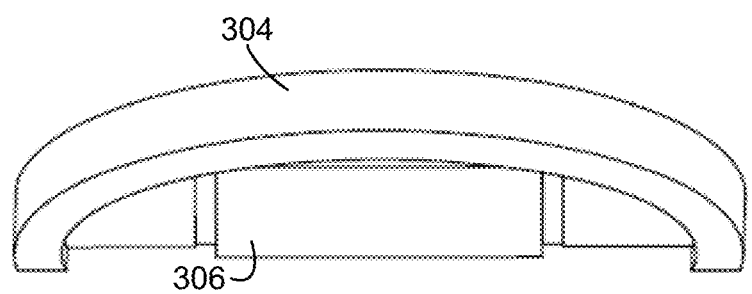
FIG. 9 is a cutaway view of a heat shield portion of a sample return spacecraft, showing a sample contained therein, according to an aspect of the present disclosure.

Referring now to FIGS. 7-9, perspective views of landing craft 600 configured to collect and process in-situ materials from a celestial body for use in additively manufacturing portions of sample return spacecraft 606, according to an aspect of the present disclosure, are shown. Spacecraft 606b is partially completed.

Landing craft 606 may include a body 702 which houses processing systems, control electronics, communications equipment and includes two or more launch stands for multiple return spacecraft 606 (labelled as spacecraft 606a & b in FIGS. 7-8). Landing gear 704; lander body 702; collector 706 may be mounted on arm 610. In some aspects, collector 706 and extruder 612 are mounted on the same arm joint 708. Collector 706 may be a scoop, claw, vacuum or other device for gathering material from the celestial body craft 600 lands on. Collector 706 may deposit raw collected material into a hopper 714 connected to conditioning systems housed within landing craft body 702. Conditioning systems process the received in-situ material into feedstock for additive manufacturing device 602. Body 702 may also house bioreactors, binder sources, and other systems for facilitating converting the in-situ material into feedstock. Power system 716, such as a radioisotope thermoelectric generator or battery pack may power landing craft 600 systems. In other aspects, craft 600 includes solar arrays. As shown in the cut away view of FIG. 9, heat shield 304 may contain sample 306 within a cavity created therein.

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

Feedstock is any material or combination of materials suitable for the material bonding component to utilize in the production of a part. Feedstock may be plastic, metal, organic material, inorganic materials or combinations of such materials. As will be apparent to those skilled in the relevant art(s) after reading the description herein, materials such as acrylonitrile butadiene styrene (ABS), polycarbonate (PC), polylactic acid (PLA), high density polyethylene (HDPE), polyphenylsulfone (PPSU), soldering wire, polymer matrix composites, polyether ether keytone (PEEK), bismuth, aluminum, titanium, tin, and the like may be used to produce desired parts via additive manufacturing. In some aspects, feedstock is in the appropriate state, shape, size, and/or other physical characteristic suitable for utilization by the material bonding component. Feedstock may be produced from asteroid regolith, regolith of other celestial bodies, from space debris, from trash, from obsolete parts, and the like. In some aspects, feedstock is a polymer filament containing metal powder. In another aspect, feedstock is a polymer containing carbon nanotubes, fibers, or the like. In yet another aspect, feedstock is a resin, a resin containing a filler, binder, and/or powder, or the like. Feedstock may be a liquid or a combination of materials having different physical states (e.g., a solid and a liquid).

The extruder melts filament and places melted filament in order to create the desired part. Filament may be plastic, metal, organic material, inorganic materials or combinations of such materials. Extruder is configured to heat filament until it melts and/or is sufficiently pliable to form portions of the desire part.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures. As will be appreciated by those skilled in the relevant art(s) after reading the description herein, certain features from different aspects of the systems, apparatus and methods of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A device configured to additively manufacture objects utilizing in-situ materials, the device comprising:
    an in-situ material collector configured to collect in-situ material on a celestial body;
    a material conditioner, with a receiving area, configured to, at the celestial body, receive collected in-situ material from the in-situ material collector at the receiving area and process the in-situ material by at least reducing the in-situ material to a dimension smaller than the in-situ material as collected with at least one of a grinder, a shifter and a chemical to produce a reduced size of the in-situ material;
    a first extruder configured to receive the reduced size in-situ material wherein the reduced size in-situ material is combined with at least one of a bioreactor and a binder source to form a filament in-situ material feedstock;
    a spooling mechanism configure to spool the filament in-situ material feedstock from the first extruder and to feed the filament in-situ material feedstock; and
    an additive manufacturing device comprising at least a second extruder to extrude the filament in-situ material feedstock feed to the second extruder from the spooling mechanism, and being configured to, at the celestial body, create at least a portion of an object utilizing the filament in-situ material feedstock.

2. The device of claim 1, wherein at least a portion of the object is at least a part of a structure or surface.

3. The device of claim 1, further comprising a descent engine and landing gear allowing landing on the celestial body wherein the celestial body has a microgravity environment.

4. The device of claim 1, further comprising a binder source supplying at least one of a bioreactor and binder source to the material conditioner.

5. The device of claim 1, wherein the at least one of the bioreactor and the binder source is an organic binder.

6. The device of claim 1, wherein the at least a portion of the object includes at least one of: a habitat; a road; a landing pad; a pressure vessel; scaffolding; and an antenna support structure.

7. The device of claim 1, wherein the first extruder comprises a die.

8. The device of claim 7, wherein the first extruder comprises heating elements to heat the supply in-situ feedstock being extruded through the die.

9. A device configured to additively manufacture a portion of a structure utilizing in-situ materials, the device comprising:
    a lander body having landing gear;
    an articulating arm, attached to the lander body, having an attached in-situ material collector configured to collect in-situ material on a celestial body;
    a material conditioner, attached to the lander body, configured to receive collected in-situ material by placement of the in-situ material at a receiving area by the articulating arm and process the in-situ material;
    a first extruder having a first heater, the first extruder configured to receive the processed in-situ material and with a binder form a polymer filament in-situ material feedstock;
    a spooling mechanism configured to spool the polymer filament in-situ feedstock material and to feed the polymer filament in-situ material feedstock; and
    an additive manufacturing device, attached to the lander body, configured to create the portion of the structure utilizing the filament in-situ material feedstock, the additive manufacturing having a second extruder mounted for positioning on the articulating arm through which the in-situ material feedstock is fed and heated by a second heater to create the portion of the structure layer by layer.

10. A device configured to additively manufacture objects utilizing in-situ materials, the device comprising:
    an in-situ material collector configured to collect in-situ material on a celestial body with a robotic arm with an end to collect in-situ material from the celestial body having microgravity;
    a material conditioner, with a receiving area to accept the collected in-situ material, configured to receive the collected in-situ material from the in-situ material collector and process the in-situ material by at least reducing the in-situ material to a dimension smaller than the in-situ material as collected with at least one of a grinder, a shifter and a chemical to produce a reduced size of the in-situ material;
    a first extruder configured to receive the reduced size in-situ material wherein the reduced size in-situ material with at least one of a bioreactor and a binder source is formed into a supply in-situ material feedstock comprising one of a first filament in-situ material feedstock and a second filament in-situ material feedstock, wherein the second filament in-situ material feedstock includes a metal;
    a spooling mechanism configured to spool the supply filament in-situ material feedstock and to feed the one of the supply filament in-situ material feedstock; and
    an additive manufacturing device comprising a second extruder and a heating device to at least one of extrude the supply filament in-situ material feedstock feed from the spooling mechanism and to heat the extruded feedstock to create at least a portion of an object layer by layer.

11. The device of claim 10, wherein at least a portion of the object is at least a part of a surface or infrastructure.

12. The device of claim 11, further comprising a descent engine and landing gear allowing landing on the celestial body and to which the device is attached during an additively manufacturing process.

13. The device of claim 11, further comprising a binder source supplying at least one of a bioreactor and binder source.

14. The device of claim 13, wherein the at least one of the bioreactor and binder source is an organic binder.

15. The device of claim 11, wherein the device is further configured to additively manufacture infrastructure and the objects include at least one of: a habitat; a road; a landing pad; a pressure vessel; scaffolding; and an antenna support structure.

16. The device of claim 11, wherein the first extruder comprises a die.

17. The device of claim 16, wherein the first extruder comprises heating elements to heat the supply in-situ feedstock being extruded through the die.

* * * * *